United States Patent [19]
Schultze

[11] Patent Number: 5,952,424
[45] Date of Patent: *Sep. 14, 1999

[54] FILM MADE OF ACRYLATE TERPOLYMER MIXTURES AND THE USE THEREOF

[75] Inventor: Dirk Schultze, Fallingbostel, Germany

[73] Assignee: Wolff Walsrode AG, Walsrode, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/815,654

[22] Filed: Mar. 13, 1997

[30] Foreign Application Priority Data

Mar. 15, 1996 [DE] Germany ............ 196 10 265

[51] Int. Cl.$^6$ .................................................. C08L 23/00

[52] U.S. Cl. ............................................................. 525/130

[58] Field of Search ..................... 524/507; 525/130

[56] References Cited

U.S. PATENT DOCUMENTS

| | | | |
|---|---|---|---|
| 4,041,105 | 8/1977 | O'Shea | 260/859 |
| 4,073,775 | 2/1978 | Matsuo | 525/130 |
| 5,216,062 | 6/1993 | Lausberg | 524/507 |
| 5,527,602 | 6/1996 | Eisen | 428/319.7 |
| 5,639,826 | 6/1997 | Niessner | 525/130 |
| 5,783,293 | 7/1998 | Lammi | 428/212 |

FOREIGN PATENT DOCUMENTS

| | | |
|---|---|---|
| 0 462 471 A2 | 12/1991 | European Pat. Off. . |
| 42 11 414 C1 | 3/1993 | Germany . |

*Primary Examiner*—Paul R. Michl
*Attorney, Agent, or Firm*—Sprung Kramer Schaefer & Briscoe

[57] ABSTRACT

The present invention relates to a film made of acrylate terpolymer blends, which substantially consists of mixtures of soft acrylate polymers, which themselves are synthesised from acrylate, styrene and acrylonitrile monomers, with thermoplastic polyurethanes having Shore hardnesses of less than 90 A as measured according to DIN 53 505.

13 Claims, No Drawings

FILM MADE OF ACRYLATE TERPOLYMER MIXTURES AND THE USE THEREOF

This invention relates to films which are produced from mixtures of thermoplastic acrylate polymers and thermoplastic polyurethanes (TPUs), and to the use thereof as a covering for hollow bodies which can be filled, such as orthopaedic support pillows for example.

TPUs as a class of materials, their properties and possible ways of processing them are described in the Kunststoff-Handbuch, Volume 7, Polyurethanes, Edited by G. Oertel, 2nd Edition, Hanser-Verlag, Munich 1983.

Single-layer films made of thermoplastic polyurethanes (TPUs), processes for producing them and their use are known from the prior art, for example from EP 0 308 683, EP 0 526 858, EP 0 571 868 or EP 0 603 680. The production of TPU films using substantially incompatible polymers as matting agents in TPU elastomers is also described in DE 41 26 499, for example.

Films made of acrylate-based polymer resins are described by Braese and Piejko in Kunststoffe, 82nd year, No. 3, pages 223–228, for example. Thermoplastic acrylates which also have an elastomeric character are also described in the literature. These include the ethylene acrylate copolymers which are known by the trade name Lotryl of the Atochem company. The acrylate worsted polymers comprising butyl acrylate main chains with methyl methacrylate side chains which are synthesised by the Röhm company also combine elastic and thermoplastic properties, however.

Soft acrylate polymers and blends thereof are described by Nigen and Tandon in Kunststoffe, 85th year, No. 9, pages 1383 to 1387, for example. However, the mixtures covered there have strengths which are too low for them to be processed as comparatively thin films to form air-filled orthopaedic pillows or other elastic mouldings, for example. The strengths which are mentioned are in the region of 10 N/mm$^2$ for films with Shore D hardnesses of around 30. With the polymer mixtures described there, higher strengths can only be obtained within the significantly higher range of Shore D hardness of 55–60.

The miscibility of soft acrylate polymers with polar, halogen-free plastics is also mentioned in the company document "Sunigum" of the Goodyear Tire & Rubber Company, Akron, Ohio (1994). In particular, however, the calendering process which is described there for forming semifinished products in the form of lengths is only of limited suitability for the thermal digestion of (semi) crystalline polymers such as TPUs, since calendering installations are not capable of providing the latent heat of fusion at a sufficiently high machine throughput, as is described by Krüger or Hoppe in the Kunststoff-Handbuch, Volume 7, Polyurethanes, Edited by G.Oertel, 2nd Edition, Hanser-Verlag, Munich 1983.

Blends of TPUs and various other polymer resins are also described in the literature. TPU/ABS blends have been known since 1978, as described by Utracki in Polymer Engineering and Science, 35th year (1995), No. 1, pages 2–17. Blends of reactive resins, which exhibit impaired thermoforming behaviour, however, are mentioned in DE 39 27 720, for example.

Bonk, Drzal, Georgacopoulos and Shah list limited mixing possibilities for TPUs with acrylates in Proceedings Annual Technical Conference of Plastics Engineers, Antec, 1985, pages 1300–1303, but identify no advantages. Another review of the possibilities of blending TPUs with harder polymethyl methacrylate is given by Deanin, Driscoll and Krowchun in Organic Coatings Plastics Chemistry, 40th year, (1979), pages 664–667. Santra, Chaki, Roy and Nando also describe the possibilities of mixing TPUs with ethylene comethacrylate resins, in Angewandte Makromolekulare Chemie, 213th year (1993), pages 7–13. Blends such as these, however, are employed to improve the impact resistance of methacrylate polymers, as stated by Heim, Wrotecki, Avenel and Gaillard, in Polymer, 34th year (1993), No. 8, pages 1653–1660.

U.S. Pat. No. 4,179,479 discloses blends of TPUs and hard thermoplastics to which terpolymer resins of methyl methacrylate, butyl acrylate and styrene are added as compatibilisers in order to improve the homogeneity of the mixture. Blends are obtained here also which are harder than the TPUs used.

Soft flexible films made of PVC-TPU blends are described by Lavallée, Carmel, Utracki, Szabo, Keough and Favis in Polymer Engineering and Science, 32nd year (1992), No. 22, pages 1716–1726. However, the possibility of plasticiser migration has to be taken into consideration directly the softness of these materials is to be improved. The low molecular weight plasticisers which are customary for the processing of PVC, the addition of which is necessary in order to obtain softer blends, are substances from the phthalate group, which are often classified by their suppliers as being potentially harmful to foetuses. Possible damage to health should be avoided for applications which are intended for contact with the skin.

Hollow bodies which can be filled, such as flexible neck pillows for example, are generally filled with fluid nowadays. Soft, adaptable coverings which are kind to the skin are required for this purpose. These must be characterised by a good texture, which is also termed "feel". Nowadays, coverings are obtained in particular by the welding of thermoformed, anatomically modelled preforms. Thick, thermoplastically formable films are required for this purpose. These fills often not only have to be capable of bonding well, but also have to be capable of being joined and at the same time being separated by the separation welding process, so that they can be produced continuously and thus economically.

However, the soft thermoplastic fills with adequate strength which are commercially available have disadvantages due to the generation of noise when they rub against themselves. Noise such as this is troublesome in the application of orthopaedic neck pillows and adversely affects the well-being and thus the recovery process of the user.

The object of the invention was to provide pillows which are as soft as possible and which have a pleasant feel. This object primarily comprises a soft film with a pleasant feel, which makes as little noise as possible when rubbed against itself and which in addition can be manufactured and processed economically.

It has surprisingly proved possible to produce pillows, and to produce the covering films which are necessary for their manufacture, from mixtures of synthetic resins of the type mentioned at the outset.

It was not obvious to one skilled in the art with the relevant previous experience that the films according to the invention would make hardly any noise when deformed. This property can be correlated with the coefficient of friction, which is unusually low for very soft films. The films which are preferred according to the invention are those which at a Shore hardness of less than 80 have a coefficient of friction, as measured according to DIN 53 375 for the contact of film against metal, of less than 1.5 for the coefficient of static friction and less than 2.0 for the coefficient of sliding friction.

Suitable thermoplastic polyurethane elastomers for the mixtures according to the invention are preferably synthesised from what are predominantly linear thermoplastic polyurethane elastomers, the longer chain diol component of which is a polyester or polyether, and which preferably have a Shore hardness of 75–90 A, most preferably 75–80 A, as determined according to DIN 53 505.

Suitable thermoplastic polyurethanes are obtainable under the trade names Desmopan, Elastollan, Estane, Morthane or Texin, for example.

In one particularly suitable embodiment the films according to the invention comprise flexible urethane elastomer formulation components, a predominant part of the soft segment phase of which is formed from ether soft segment constituents.

Acrylate polymer resins which are suitable for the mixtures of thermoplastic elastomers according to the invention have Shore A hardnesses of less than 80. The preferred acrylate polymer resins have an acrylate content of at least 45% by weight, a styrene content of at least 12% by weight, and an acrylonitrile content of at least 12% by weight, with respect to the content of monomer radicals in the total weight of the thermoplastic acrylate resin used in each case. Suitable soft acrylate polymers are commercially available under the trade name Sunigum, for example.

It is stated by Elias in Makromoleküle, Volume 2, 5th Edition, Hüthig und Wepf, Heidelberg, 1992, that in polymer mixtures one polymer constitutes a solvent for the other polymer. Polymers are only miscible in very rare cases, since the Gibbs free energy of mixing is mostly positive. Most polymer mixtures or blends therefore exhibit properties, particularly those which can be observed macroscopically, which differ considerably from the proportional properties of the components of the mixture of the blend concerned. For the blend films described here, however, the properties which are observed macroscopically surprisingly alter according to the quantitative proportions of the components of the mixture, without the appearance of significant shear-dependent demixing structures. The polymer resins which are mixed for this invention already inherently possess multiphase structures in each case, so that a mutual extension of the network-like structures of the components of the mixture has to be assumed in the present invention. The mixtures according to the invention can thus be processed to form films which exhibit properties which do not obviously represent the corresponding proportional properties of the mixed polymer resins which are used.

Thermoplastic acrylate elastomer resins which are very suitable for use for the production of films contain butyl acrylate as a significant constitutional component.

Films which are very suitable according to the invention are characterised in that they have a thermoplastic acrylate elastomer content of at least 25% by weight and a thermoplastic polyurethane content of at least 50% by weight.

One suitable embodiment of the films according to the invention additionally contains customary additives from the group comprising I. anti-seizing agents, inorganic or organic separating agents, II. parting or demoulding agents, III. pigments or fillers, and IV. stabilisers.

The customary additives which the films according to the invention may contain are described, for example, by Gächter and Müller in Kunststoff-Additive, Carl Hanser Verlag, Munich, 3rd Edition (1989).

Inorganic additives which are particularly suitable come from the group comprising V. natural and synthetic hydrated silica or silicates, and layer silicates also, VI. titanium dioxide, VII. calcium carbonate.

Films which are preferred according to the invention are those which have a total thickness between 20 $\mu$m and 500 $\mu$m.

Customary thermal forming processes for the processing of plastics to form sheet-like formed bodies by extrusion, which is preferably effected by the blown film process, are particularly suitable for the production of the films according to the invention.

The surface properties of the films according to the invention can be modified on one or both sides by known physical and chemical methods of treatment, such as corona discharge treatment, for example.

Polymer mixtures, blends or cuts can be prepared by the mechanical mixing of melts, latices or solutions of two separately produced polymer resins, or by the in situ polymerisation of monomers in the presence of a pre-formed polymer resin.

This is more advantageously effected by mixing two separately produced polymer resins in the melt. For this purpose, the polymer resins, which are usually present in the form of beads, granules or powders, are mixed in kneaders or using extruders. In the course of this procedure, the thermoplastic polymer resins which are suitable according to the invention are heated above their glass transition or fusion temperature. Good, thorough mixing is achieved at higher temperatures and/or under the action of high shear fields. The production of a film from compounds which have been produced before the processing of the film is preferred according to the invention. For this purpose, the polymer resins which are used for the extrusion to form a film are subjected to premixing beforehand in their softened state, in a compounding step. Appliances which are suitable for a mixing step such as this are the compounding appliances, the types of which are known. Appliances having a plurality of endless screws, particularly the twin-screw kneaders which are favoured for compounding, have proved to be advantageous.

An embodiment which has likewise proved to be advantageous is the production of a film by a process which comprises the premixing of the raw materials used in their solid, unsoftened state. Premixing is effected here before the thermal digestion of the film raw materials.

The film is suitable for bonding to itself in the form of flexible tubes of film, and also in the form of single layers or single lengths. It is also suitable for bonding to stiffer films, however, e.g. for the formation of air-filled orthopaedic pillows having a preferred direction of deformation under load.

Bonding can be effected by all the techniques which are commonly used for acrylate polymers or TPUs. The films can also be bonded to themselves or to other suitable substrate materials by thermal or high-frequency welding. Substrate materials which are particularly suitable are the TPUs, the types of which are known.

Possibilities for the production of pillow-shaped elements for damping applications which deform asymmetrically when inflated or filled are afforded by the joining, over less than its entire area, of a relatively soft film according to the invention, which has a Shore A hardness less than 90, preferably less than 80, to other films or substrates which are harder in each case. In cases such as these, the hardness of the substrates are advantageously within a range greater than 85 Shore A, preferably greater than 90 Shore A.

The films which are described within the scope of the following examples and comparative examples were produced by blown film extrusion. The construction of the endless screw appliances which are suitable for the digestion of thermoplastic resins are described, for example, by Wortberg, Mahlke and Effen in Kunststoffe, 84 (1994), 1131–1138, by Pearson in Mechanics of Polymer Processing, Elsevier Publishers, New York, 1985, or by the Davis-Standard Company in Paper, Film and Foil Converter 64 (1990), pages 84–90. Dies for forming the melts into films are explained, amongst other topics, by Michaeli in Extrusions-Werkzeuge, Hanser Verlag, Munich 1991.

Example A

An opaque white film, for which a previously prepared compound was used as the raw material, was produced with the aid of a film-blowing die. The compound consisted of 28% by weight of soft acrylate-styrene-acrylonitrile terpolymer with a Shore A hardness of 53, 68,5% by weight TPU of Shore A hardness 80 containing polypropylene oxide soft segments, 2% by weight calcium carbonate and 1,5% by weight of low molecular weight amide waxes.

The extrusion device was operated at temperatures between 160° C. and 200° C. The flow of compound melt was discharged through an annular gap extrusion die with a diameter of 110 mm, in a film blowing head at a processing temperature of 190° C. The annular length of melt was cooled by blowing air against it, and was subsequently laid flat, cut open in its edge region, and was wound up in the form of single lengths 200 μm thick.

Example B

An opaque film with a thickness of 200 μm was produced analogously to Example A. The raw materials were brought together shortly before the inlet of the extruder. The composition of the blend was represented by the proportions 83% by weight TPU, 14% by weight acrylate terpolymer, 1% by weight calcium carbonate and 2% by weight of waxes.

Example C

A film of thickness 200 μm was again produced analogously to Example A. A TPU-based colour master batch was added to the compound used in Example A, at the inlet of the extruder, so that the composition of the blue blend was 255% by weight acrylate terpolymer, 70% by weight TPU, 2% by weight calcium carbonate, 1.5% by weight titanium dioxide, 1% by weight of waxes and 0.5% by weight organic colouring pigments.

Comparative Example 1

A TPU film was produced using the parameters cited for Example A. The composition of the transparent film, which was 200 μm thick, was 98% by weight TPU with a soft segment phase based on polypropylene oxide, and 2% by weight of low molecular weight amide waxes.

Comparative Example 2

An acrylate-styrene-acrylonitrile terpolymer film of thickness 200 μm was produced, using 6% by weight calcium carbonate and 94% by weight acrylate terpolymer. The processing parameters corresponded to those of Example A.

Comparative Example 3

A 200 μm thick blend film comprising 50% by weight of low density polyethylene, 49% by weight TPU—analogous to that in Example A—and 1% by weight of low molecular weight amide waxes was produced under the same processing conditions as in Example A.

Assessment of the films produced within the scope of the examples and comparative examples:

The films produced in the examples and comparative examples were assessed in part as regards properties relevant to their application, such as the generation of noise when rubbed against themselves, their kindness to the skin/kindness to the touch or feel, their separation welding behaviour and their bursting pressure resistance. The assessment of these relevant properties was effected as a subjective assessment by a plurality of independent persons, and the assessments are given in Table 1. As far as possible, the subjective assessments were verified by standard testing methods.

Thus the bursting pressure resistance correlated with the strengths which were determined in the tensile test according to DIN 53 455. For the assessment of the bursting pressure resistance, bags were welded from the films produced, and were filled with water and allowed to drop from an increasing height.

Noise generation and feel are measured variables which represent combined variables comprising, amongst others, the Shore hardness analogous to DIN 53 505, the stress at slight deformations (100% for the elastomers here) according to DIN 53 455, and the coefficients of friction according to DIN 53 375. Noise generation and feel were assessed manually on the finished lengths of film.

The separation welding behaviour is again a combined variable which comprises elements of the resistance to tear propagation and of the softening range. For the assessment of the separation weldability, lengths of film placed one on top of another were separated with a heated metal rod and the progress of the separation operation, as well as the quality of the weld seam, were assessed.

The softening range determines the processing properties during separation welding, and also determines the subsequent reliability of application. It was determined using a Kofler heating bank. Strips of film about 200 mm long and about 4 mm wide were cut from the films to be measured and placed on the Kofler heating bank. The measurement was made after about 2 minutes. For this purpose the specimen was slowly pulled off from the Kofler heating bank at an angle of about 90°, starting from the lowest to the highest temperature. The point at which the film tore and the rest of the film remained adhering to the Kofler bank represented the softening point. Five measurements were made on each specimen. The highest and lowest value of each of the five measurements was quoted as the softening range.

The permeability to oxygen (DIN 53 380, Part 3) and the permeability to water vapour (DIN 53 122 at 23° C., 85% relative humidity), represent important quantities which are relevant to the application. For the filling of pillow-shaped structures such as neck supports or orthopaedic mattresses, for example, it is very important that the filling medium does not escape, or at least that its escape is significantly impeded. By means of the films according to the invention, an optimisation is achieved here between the properties of the TPU and the soft acrylate terpolymers as regards both permeability to oxygen and permeability to water vapour.

Characteristic data of the films produced within the scope of the examples and comparative examples are reproduced in the following Table. These data clearly show that the films according to the invention which are described in the examples are advantageous compared with the films described within the scope of the comparative examples.

TABLE 1

Properties of the films produced within the scope of the examples and comparative examples

| Property | Method of determination | Units | Example A | Example B | Example C | Comparative Example 1 | Comparative Example 2 | Comparative Example 3 |
|---|---|---|---|---|---|---|---|---|
| Noise generation on rubbing | see text | ./. | slight | medium | slight | considerable | slight | considerable |
| Feel | see text | ./. | pleasant | pleasant | pleasant | coarse | pleasantly soft | very stiff |
| Coefficient of static friction | DIN 53375 | ./. | 1.1 | 1.4 | 0.8 | 1.4 | 0.9 | 0.8 |
| Coefficient of sliding friction | DIN 53375 | ./. | 1.7 | 1.6 | 1.3 | 1.7 | 1.1 | 0.9 |
| Permeability to water vapour | DIN 53122 | g/(m²d) | 85 | 87 | 80 | 92 | 77 | 50 |
| Permeability to oxygen | DIN 53380, Part 3 | Ncm³/(m²d bar) | 1500 | 1300 | 1400 | 1200 | 1800 | 700 |
| Softening range | see text | °C. | 163–165 | 164–165 | 165–166 | 157–161 | 110–125 | 155–158 |
| Shore A hardness | DIN 53505 | ./. | 77 | 79 | 76 | 80 | 53 | 95 |
| Stress at 100% elongation | DIN 53455 | N/mm² | 3.7 | 3.9 | 3.6 | 4.4 | 2.7 | 6.0 |
| Resistance to tearing | DIN 53455 | N/mm² | 14 | 23 | 17 | 31 | 8 | 7 |
| Elongation at tear | DIN 53455 | % | 750 | 800 | 700 | 800 | 300 | 150 |
| Resistance to tear propagation | DIN 53515 | N/mm | 30 | 36 | 32 | 40 | 15 | 18 |
| Bursting pressure resistance | see text | ./. | good | good | good | very good | low | very low |
| Separation weldability | see text | ./. | very good | very good | very good | moderate separation | very good | not weldable |

It can clearly be seen from Table 1 that, for covering fluid-filled pillows, the films described in the examples are considerably superior to the films from the comparative examples which are known from the prior art. The films according to the invention offer advantages in strength compared with pure films made of soft acrylate elastomers, such as those described in comparative example 2. Compared with the pure TPU films from comparative example 1, they provide a better feel, a lack of noise, and improved processing behaviour. Moreover, in contrast to TPU/polyolefine blends such as those described in comparative example 3, they offer homogeneous property characteristics which correspond to the respective proportions of TPU and acrylate resins used in the mixture.

I claim:

1. A film formed from a polymeric blend consisting essentially of thermoplastic polyurethane elastomers having a Shore A hardness of 75–90 and terpolymer resins synthesized from acrylate, styrene and acrylonitrile monomers, said terpolymer resins having a Shore A hardness of less than 80.

2. A film according to claim 1, wherein the raw material mixture used for its production has a Shore A hardness of less than 80 as measured according to DIN 53 505.

3. A film according to claim 1, wherein a predominant part of the content of the resin component used as the thermoplastic urethane elastomer component of the formulation comprises ether soft segment constituents.

4. A film according to claim 1, wherein, at a Shore hardness of less than 80, it has a coefficient of friction as measured according to DIN 53 375 for the contact of film against metal of less than 1.5 for the coefficient of static friction and less than 2.0 for the coefficient of sliding friction.

5. A film according to claim 1, having a content of thermoplastic acrylate elastomer of at least 25% by weight and a content of thermoplastic polyurethane of at least 50% by weight.

6. A film according to claim 1, wherein the thermoplastic acrylate elastomer has an acrylate content of at least 45% by weight, a styrene content of at least 12% by weight, and an acrylonitrile content of at least 12% by weight, with respect in each case to the content of monomer radicals in the total weight of the thermoplastic acrylate resin used.

7. A film according to claim 1, containing butyl acrylate as a thermoplastic acrylate elastomer component.

8. A film according to claim 1, containing customary additives selected from the group consisting of
   I. anti-seizing agents, inorganic or organic separating agents,
   II. parting or demoulding agents,
   III. inorganic or organic pigments or fillers, and
   IV. stabilizers.

9. A process for producing a film according to claim 1, wherein the raw material mixture is digested by means of an extrusion process and is discharged through a film die connected downstream.

10. A process for producing a film according to claim 1, wherein the film is shaped and processed through a blown film die connected downstream of an extrusion device.

11. A process for producing a film according to claim 1, wherein at least two of the polymer resins used as raw materials for the film extrusion have previously been subjected to premixing in their softened state in a compounding step.

12. A process for producing a film according to claim 1, wherein the raw materials used for extrusion are mixed in an unsoftened state.

13. A pillow-, ball- or blister-shaped body which can be filled, made of a film according to claim 1.

* * * * *